United States Patent [19]

Poveromo

[11] 4,422,664
[45] Dec. 27, 1983

[54] BOAT TRAILER FENDER, LAMP AND LICENSE PLATE SUPPORT

[75] Inventor: George A. Poveromo, Miami, Fla.

[73] Assignee: Sebert E. Reese, II, Miami Lakes, Fla.

[21] Appl. No.: 273,565

[22] Filed: Jun. 16, 1981

[51] Int. Cl.³ .............................................. B62D 3/10
[52] U.S. Cl. .................................. 280/414.1; 296/1 C
[58] Field of Search ................. 280/414.1, 414.3, 160, 280/152 R, 153 R, 154, 157; 296/1 C; 362/61, 83, 66, 67, 70, 71

[56] References Cited

U.S. PATENT DOCUMENTS 3,540,606 11/1970 Johnson ............................ 280/414.1
3,868,030 2/1975 Bell ...................................... 280/144

FOREIGN PATENT DOCUMENTS 613439 1/1961 Canada ............................. 280/414.1
1806228 5/1970 Fed. Rep. of Germany ... 280/414.1

Primary Examiner—Joseph F. Peters, Jr.
Assistant Examiner—Ross Weaver
Attorney, Agent, or Firm—Sughrue, Mion, Zinn, Macpeak & Seas

[57] ABSTRACT

A boat trailer has a unitary fender having a base to which there is attached a light and license plate support bar. The unitary fender is attached to the trailer running gear by suitable brackets and bolts. The light support bar is pivotably attached at one end to the base near the center thereof and is releasably fastened to the base near the rear of the fender. A bracket for supporting a lamp and license plate is attached to the opposite end of the bar. Electrical wires extend from the vehicle's electrical system through the fender and bar to the lamp. The bar is fastened to the base in such a fashion that the lamp and license plate are repositionable from the rear of the trailer where the lamp and license plate are located during over-the-road travel to a position forward of the fender prior to launching a boat from the trailer. In this regard, the bar is released from the base of the fender and rotated 180° so that the lamp and license plate are forward of the fender whereby the lamp and associated electrical wiring will not contact the water during launching of the boat thus avoiding dangerous electrical conditions.

8 Claims, 8 Drawing Figures

BOAT TRAILER FENDER, LAMP AND LICENSE PLATE SUPPORT

BACKGROUND OF THE INVENTION

1. Field of the Invention

This invention pertains to boat trailer fenders and a support bar for the trailer lights and license plate. The fenders are constructed in a single unitary piece and contoured to fit over the wheels of the trailer and to pivotably support the lamp and license plate support bar. The bar is movable to the front of the trailer prior to launching of a boat so that the lamp and associated electrical wiring will not contact the water and get wet during launching of the boat.

2. Statement of the Prior Art

The prior art shows boat trailer taillight assemblies which are designed to be either removably attached to the boat or boat trailer or are removable so that the lamps will not contact the water during launching. Unlike the present invention, the prior art does not disclose a unitary fender structure having a base to support a hollow bar having the trailer lamp and license plate attached at one end thereof and pivotably attached at the opposite end to the base whereby the bar, lamp and license plate are pivotable 180°. This construction provides a single piece fender to fit over the wheels of a trailer and permits the lamp to be re-located from the rear of the trailer to the forward end of the trailer during launching of a boat so that the lamp and associated electrical wiring will not contact the water thus preventing dangerous electrical conditions.

Representative of the prior art devices are those listed below:

| Patentee | Pat. No. | Issue Date |
| --- | --- | --- |
| N. E. Passman | 2,653,002 | Sept. 22, 1953 |
| H. A. Hartman | 3,229,945 | Jan. 18, 1966 |
| Whitley, Jr. | 3,885,146 | May 20, 1975 |
| Howell | 3,887,093 | June 3, 1975 |
| Renfrow | 4,058,720 | Nov. 15, 1977 |
| Markey | 4,091,442 | May 23, 1978 |

SUMMARY OF THE INVENTION

Boat trailers are required to have running lights so as to be visible during travel at nighttime. Due to electrical hazards which may occur during launching, it became evident that it would be advantageous to provide a unitary fender structure and lamp support bar whereby the lamp would be easily re-positioned from the rear of the trailer during launching of a boat to the front of the trailer so that the electrical wiring and lamp would not contact the water causing dangerous electrical conditions or deterioration of the lamps and associated wiring.

One object of this invention is to construct a unitary fender for boat trailers adapted to support a bar to which are attached the trailer lamps and license plate.

One other object of this invention is to construct a fender having a horizontal base portion and a vertical wall portion for supporting a bar to which there is attached a trailer lamp and license plate all of which will be inexpensive to produce and simple to install on the trailer.

Another object of this invention is to provide a unitary fender which is adaptable to either single axle or double axle trailers.

It is yet another object of this invention to provide such a trailer fender and a lamp and license plate support bar which is pivotably attached to the base of the fender so that the lamp and license plate may be re-positioned to a location where they will not contact the water during launching of the boat.

These and other objects of this invention will become apparent from a consideration of the specification when read in conjunction with the annexed drawings.

DESCRIPTION OF THE PREFERRED EMBODIMENT

Figure 2:
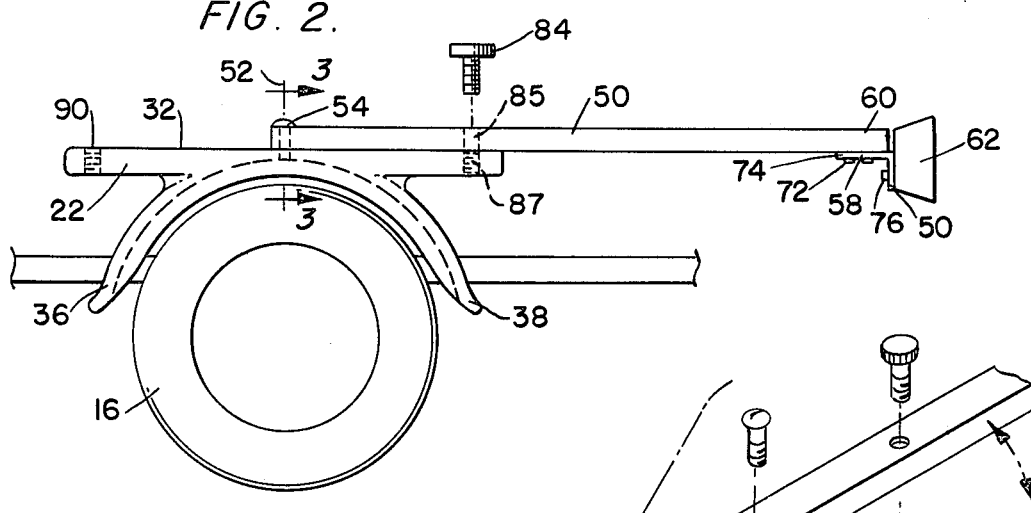
FIG. 2 is a side view of the unitary fender and lamp support bar of FIG. 1.
Figure 5:
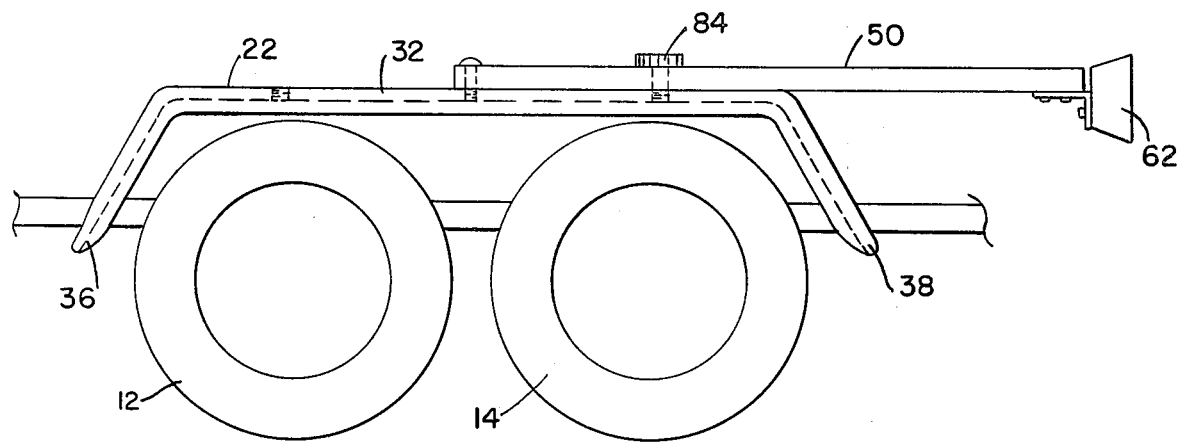
FIG. 5 is a side view of the fender and support bar for a double wheel trailer.

A boat trailer 10 has standard multiple running gear with wheels 12 and 14 (one for each axle shown) as best seen in FIG. 5 or a single axle structure with wheels 16 (one shown) as best seen in FIG. 2. The trailer 10 has the usual cradle 18 for supporting a boat to be towed.

Figure 1:
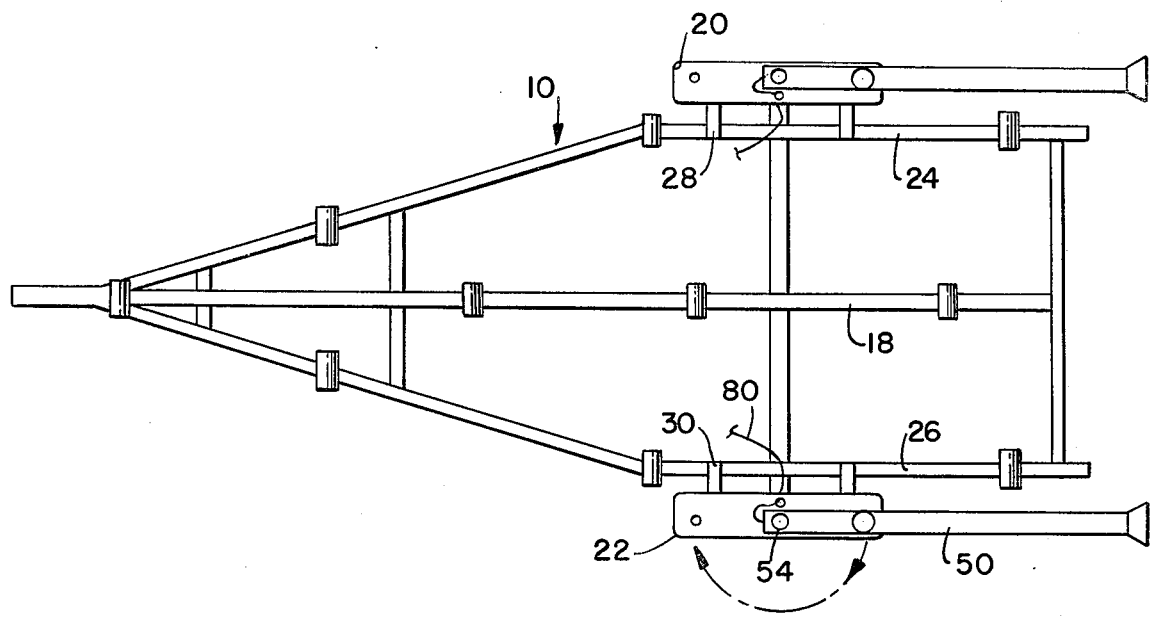
FIG. 1 is plan view of a boat trailer having fenders for the wheels thereof and a lamp support bar pivotably attached to the base of the fender.

The wheels of the trailer 10 have fenders 20 and 22, FIG. 1, which are attached to the trailer running gear rails 24 and 26 by brackets 28 and 30. The brackets 28 and 30 may be attached to the fenders 20 and 22 by welding or they may be molded integral therewith.

Figure 3:
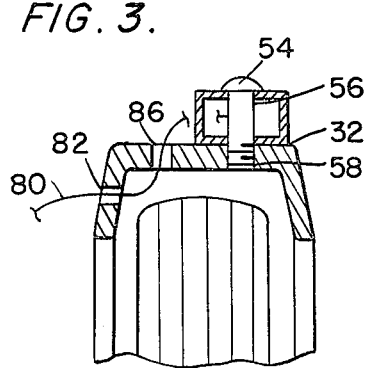
FIG. 3 is an end view of the bar pivotably attached to the base of the fender showing the bar to be hollow so that electrical wiring may extend from the towing vehicle's electrical system to the lamp secured to the end of the bar.
Figure 4:
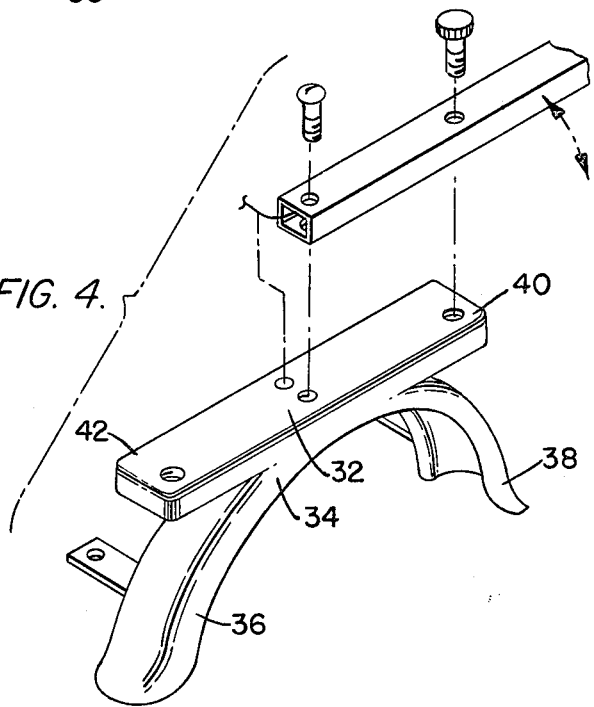
FIG. 4 is an exploded view of the invention showing the fender, bar and fasteners for pivotably mounting the bar to the base.

The fenders 20 and 22 are identical in structure and, for the sake of brevity, only one will be discussed. Fender 22, as best seen in FIGS. 2, 3 and 4 has a base 32 integrally constructed with a semi-circular portion 34 having downwardly extending segments 36 and 38 for fitting over the wheels of the trailer. The base 32 is generally planner in configuration having a rearward end 40 and forward end 42 each extending generally perpendicular to the segments 36 and 38. The base 32 may be of any desired thickness not inconsistent with the thickness of the semi-circular portion 34. In this connection, the base 32, semi-circular portion 34 and depending segments 36 and 38 are molded in a unitary piece from a suitable mold. Any suitable durable material may be used to make the fenders including metal, aluminum, steel and plastic. The brackets 28 and 30 may either be molded with the fenders or are attached by suitable means as by welding or bolting.

The bar 50 is of rectangular configuration and is pivotable about a vertical axis 52 by a bolt 54 which extends through an aperture 56 in the bar 50 and threaded into an aperture 58 in the base 32. By this arrangement, the bar may be swung 180° about a horizontal arc on the pivot bolt 54.

A bracket 58 is attached to the end 60 of the bar 50 and has a front surface 60 for supporting a lamp 62 thereon. The bracket 58 is secured to the end 60 of the bar 50 by inserting bolts 72 through the apertures in the horizontal portion 74 and through the apertures 76 in the bar.

The lamp 62 is fastened to the front surface 50 by suitable bolts 76 and electrical wires 80, FIGS. 1, 3 and 4, extend from the towing vehicle's electrical system (not shown) through apertures 82 and 86 in the fender 22 through the hollow bar 50 to the lamp 62. Identification indicia such as a license plate (not shown) may be mounted adjacent to the lamp 62 on the bracket 58.

When the boat is being towed to or from the launching ramp, bar 50 is oriented such that the lamp 62 and identification indicia extend beyond the rear of the boat as is required. A hand manipulable bolt 84 is inserted through an aperture 85 in the bar 50 and into a threaded aperture 87 in the rearward portion 40 of the fender. Thus, the lamp and license plate are securely fastened so as to project from the rear of the trailer as is required. When the boat is to be launched, the bolt 84 is removed by hand and the bar is then swung 180° through a horizontal arc about the pivot axis 52 on bolt 54 until the bar lies over the forward end 42 of the base 32. The bolt 84 is inserted through the aperture 85 and a threaded aperture 90 to secure the bar, lamp and license plate forward of the trailer fender. By this construction, the lamp 62 and electrical wiring 80 are re-positioned to a forward location where they will not get wet when the trailer is lowered down the ramp and into the water.

The fender 22 of FIG. 5 is identical to that of FIGS. 1-4 except that it is molded in a larger piece to fit over the wheels of double axle trailers having wheels 12 and 14 as best seen in FIG. 5.

The advantages of this arrangement over the prior art are the ease by which the trailer wheels may be fitted with single piece fenders, the ease by which the lamp support bar may be attached to the trailer fender for normal over-the-road travel and the ease by which the bar and lamp may be re-positioned to a forward position during launching of a boat. The fender and lamp support bar provides a simple structure which is easily installed and yet provides a means for lessening or eliminating the hazards of electrical shocks due to deterioration of the trailer lamp and the associated electrical wiring as a result of constant contact with the water during launching.

Figure 6:
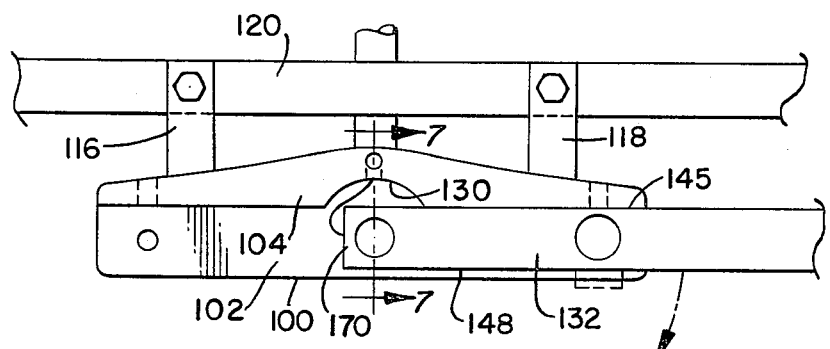
FIG. 6 is plan view of the fender attached to the trailer and having a vertical side wall to which the support bar abuts.
Figure 7:
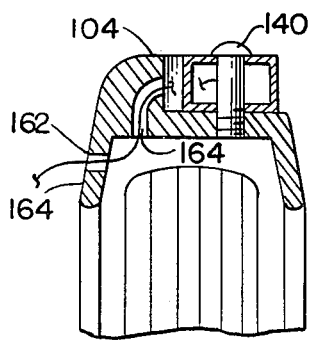
FIG. 7 is a sectional view through the line 7—7 of FIG. 6 showing the support bar attached to the base of a fender and a vertical side wall on the base.
Figure 8:
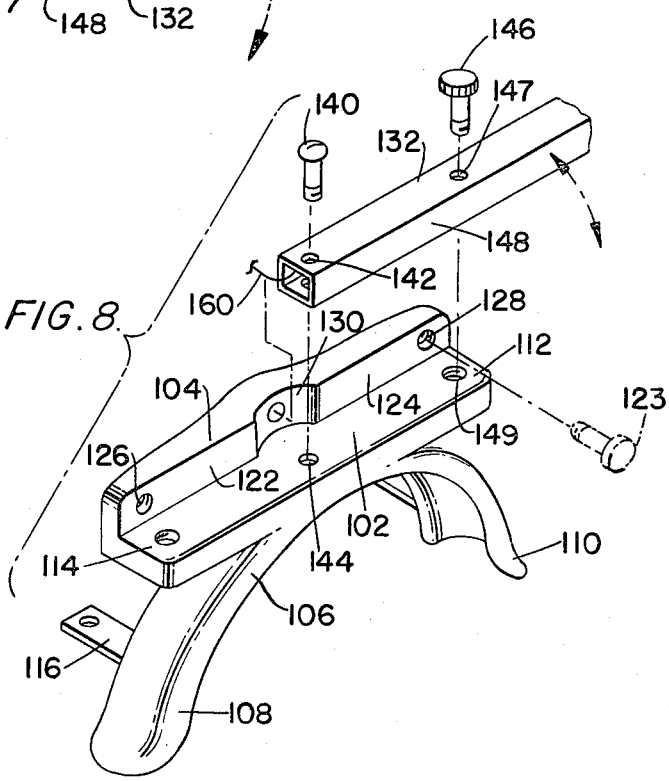
FIG. 8 is an exploded perspective view of the unitary fender, the lamp and license plate support bar and brackets for attaching the fender to the trailer running gear.

A modified form of the invention is shown in FIGS. 6-8. A solid unitary fender 100 has a base 102 having a vertical side wall 104 integrally molded therewith. The base 102 is generally planner having rearward and forward end segments 112 and 114 which are generally perpendicular to the depending portions 108 and 110. The base 102, vertical side 104 and semi-circular portion 106 are molded in a unitary structure from a suitable mold. Any suitable durable material may be used such as metal, aluminum, steel or plastic. The fender is so constructed as to be durable, rigid and rust resistant. Brackets 116 and 118 may be attached to the depending portions 108 and 110 and to the running gear 120 by any suitable means such as nuts and bolts or by welding. Also, the brackets 116 and 118 may be integral with the fender 100, having been molded from the same mold.

The vertical side wall 104 has flat faces 122 and 124 having apertures 126 and 128 bored therein which may be used in conjunction with bolts 123 to fasten the fender to the trailer frame. A circular cutout segment 130 is provided central of the faces 122 and 124, its function to be presently explained.

A hollow bar 132, similar to bar 50, is pivotably attached to the base 102 by a bolt 140 which extends through apertures 142 (one shown in the bar) an aperture 144 in the base 102. When the trailer is being hauled over the road, the bar 132 with lamp and identification indicia such as a license plate (not shown) is in the rearward position so that the lamp and license plate are behind the trailer as is required. The side 105 of the bar abuts against the face 124. A bolt 146 extends through apertures 147 (one shown) in the bar 102 and through an aperture 149 in the base 102 to secure the bar to the base. Prior to launching the boat from the trailer into the water, the bolt 146 is removed by hand and the bar 102 is rotated 180° about the vertical axis of the bolt 140 to a position forward of the trailer fender 100. The side 148 of the bar abuts against face 122. Electrical wires 160 extends from the towing vehicle's electrical system through apertures 162 and 164 in the fender and through the hollow bar 132 to the lamp.

When the bar 132 is swung from its rearward position, as best seen in FIG. 6, to a forward position, preparatory to launching a boat, the end 170 of the bar 132 passes about the cutout segment 130 without hindrance.

This unitary fender provides a simple structure which is easily and simply molded and can be readily installed on the running gear of a tailer having either single or double axles. Further, this structure permits the attachment of a trailer lamp support bar whereby the trailer lamp will be easily and readily re-positioned from an over-the-road running position to a position forward of the fender where the lamp and associated electrical wires will not contact the water during launching of the boat.

While the invention has been particularly shown and described with reference to a preferred embodiment thereof, it will be understood by those skilled in the art that various changes in the form and details of the fender and associated bar may be made therein without departing from the spirit and scope of the invention.

What I claim is:

1. A fender, lamp and license plate support, for a boat trailer comprising:
   a semi-circular portion
   a horizontal base having ends
   a hollow bar having a lamp and license plate attached thereto;
   said semi-circular portion being integral with said horizontal base and depending therefrom; and
   said hollow bar pivotably attached to said base midway of said ends so that the lamp and license plate may be positioned behind the trailer during over-the-road travel and repositioned forward of the trailer during launching of a boat therefrom whereby the lamp will not contact the water during launching.

2. A fender, lamp and license plate support, for a boat trailer as defined in claim 1, wherein:

said horizontal base is solid and said bar is hollow whereby electrical wires extend from the vehicles electrical system through said hollow bar to said lamp for lighting same.

3. A fender, lamp and license plate support, for a boat trailer as defined in claim 1, wherein:
said horizontal base and said semi-circular portion are molded in a unitary construction and attached to the trailer running gear rails by brackets.

4. A fender, lamp and license plate support, for a boat trailer as defined in claim 1, wherein:
said horizontal base is perpendicular to the vertical axis of said semi-circular portion and extends beyond said semi-circular portion and said depending segments.

5. A fender, lamp and license plate support, for a boat trailer as defined in claim 1, wherein:
said horizontal base, semi-circular portion and depending segments are molded in a unitary construction and fastened to the trailer running gear by brackets and said hollow bar is pivotably attached to said horizontal base on a vertical pivot axis midway of said ends of said semi-circular portion whereby said hollow bar may be rotated through a horizontal arc from an over-the-road running position where the lamp and license plate are at the rear of the trailer to a position forward of the trailer fender whereby the lamp will not contact the water thus avoiding dangerous electrical conditions.

6. A fender, lamp and license plate support, for a boat trailer as defined in claim 1, and:
a vertical side wall integral with said horizontal base, semi-circular portion and depending segments and said hollow bar pivotably attached to said base midway of said ends of said horizontal base and abutting said side wall.

7. A fender, lamp and license plate support, for a boat trailer as defined in claim 6, and
a circular cut-out on the face of said vertical wall for permitting the end of said hollow bar adjacent the pivot point to clear said face.

8. In combination with a boat trailer having an axle, wheels on each side of said axle, running gear and a boat cradle, the improvement comprising:
a fender having a semi-circular portion with depending segments, a base having a side wall, faces on said side wall interrupted by a circular cut-out, said base and said side wall extending above and beyond said semi-circular portion; and
a bar pivotably attached to said base at one end, a lamp and license plate attached to said bar at the opposite end, said bar with said lamp and said license plate secured to said base and abutting one of said faces so that the lamp and license plate will be rear of the trailer during over-the-road travel and repositioned forward of said trailer and secured to said base abutting the other face so that the lamp and license plate will be forward of the trailer during launching of a boat whereby the lamp and associated electrical wiring will not contact the water thus avoiding dangerous electrical conditions.

* * * * *